(12) United States Patent
Oishi et al.

(10) Patent No.: US 12,406,515 B2
(45) Date of Patent: Sep. 2, 2025

(54) INFORMATION PROCESSING APPARATUS, INFORMATION PROCESSING METHOD AND NON-TRANSITORY STORAGE MEDIUM

(71) Applicant: CANON KABUSHIKI KAISHA, Tokyo (JP)

(72) Inventors: Go Oishi, Kanagawa (JP); Yusuke Muramatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 372 days.

(21) Appl. No.: 17/884,825

(22) Filed: Aug. 10, 2022

(65) Prior Publication Data

US 2023/0062113 A1 Mar. 2, 2023

(30) Foreign Application Priority Data

Aug. 24, 2021 (JP) .................. 2021-136149

(51) Int. Cl.
*G06V 30/32* (2022.01)
*G06T 5/50* (2006.01)
(Continued)

(52) U.S. Cl.
CPC ............. *G06V 30/333* (2022.01); *G06T 5/50* (2013.01); *G06V 30/164* (2022.01); *G06V 30/19147* (2022.01)

(58) Field of Classification Search
CPC ............. G06V 30/19147; G06V 30/22; G06V 30/148; G06V 30/28; G06V 30/19173;
(Continued)

(56) References Cited

U.S. PATENT DOCUMENTS 7,660,483 B2 * 2/2010 Nicholson ............ G06V 30/164
358/463
8,488,181 B2 * 7/2013 Wu .................... G06V 30/1448
358/1.18
(Continued)

FOREIGN PATENT DOCUMENTS

| JP | 2010122791 A | 6/2010 |
| JP | 2020052513 A | 4/2020 |
| JP | 2021039424 A | 3/2021 |

OTHER PUBLICATIONS

C. Ramaiah, R. Plamondonm and V. Govindaraju, "A Sigma-Lognormal Model for Handwritten Text CAPTCHA Generation," 2014 22nd International Conference on Pattern Recognition, Stockholm, Sweden, 2014, pp. 250-255, doi: 10.1109/ICPR.2014.52. (Year: 2014).*

(Continued)

*Primary Examiner* — Chan S Park
*Assistant Examiner* — Paulo Andres Garcia
(74) *Attorney, Agent, or Firm* — ROSSI, KIMMS & McDOWELL LLP

(57) ABSTRACT

The information processing apparatus according to the present disclosure synthesizes a handwriting image with a noise image to generate a synthesized image, generates a correct label indicative of handwriting pixels from the handwriting image, and applies the synthesized image and the correct label as learning data to generate a learning model.

10 Claims, 13 Drawing Sheets

(51) Int. Cl.
*G06V 30/164* (2022.01)
*G06V 30/19* (2022.01)

(58) Field of Classification Search
CPC .. G06V 30/283; G06V 30/293; G06V 30/412; G06V 30/15; G06V 30/333; G06V 30/164; G06V 10/82; G06V 10/774; G06T 5/50
See application file for complete search history.

(56) References Cited

U.S. PATENT DOCUMENTS

| | | | |
|---|---|---|---|
| 10,546,217 B2 | 1/2020 | Albright et al. | |
| RE47,889 E * | 3/2020 | Saund | G06V 30/413 |
| 10,671,892 B1 * | 6/2020 | Daskalov | G06F 18/217 |
| 10,984,284 B1 * | 4/2021 | Corcoran | G06V 30/40 |
| 11,295,155 B2 * | 4/2022 | Xu | G06V 30/153 |
| 11,341,758 B1 * | 5/2022 | Stoltenberg | G06N 3/08 |
| 2013/0136315 A1 * | 5/2013 | Kawamoto | G06V 30/418 |
| | | | 382/112 |
| 2019/0205632 A1 * | 7/2019 | Yu | G06T 3/04 |
| 2019/0392207 A1 * | 12/2019 | Young | G06V 30/274 |
| 2020/0311459 A1 * | 10/2020 | Zagaynov | G06V 30/19147 |

OTHER PUBLICATIONS

Huseyin Kusetogullari, Amir Yavariabdi, Johan Hall, Niklas Lavesson, DIGITNET: a Deep Handwritten Digit Detection and Recognition Method Using a New Historical Handwritten Digit Dataset, Big Data Research, vol. 23, 2021, 100182, ISSN 2214-5796, https://doi.org/10.1016/j.bdr.2020.100182. (Year: 2021).*

Rowel Atienza, Data Augmentation for Scene Text Recognition, 2021, https://arxiv.org/abs/2108.06949 (Year: 2021).*

Long "Fully Convolutional Networks for Semantic Segmentation", The IEEE Conference on Computer Vision and Pattern Recognition (CVPR), 2015: pp. 3431-3440.

* cited by examiner

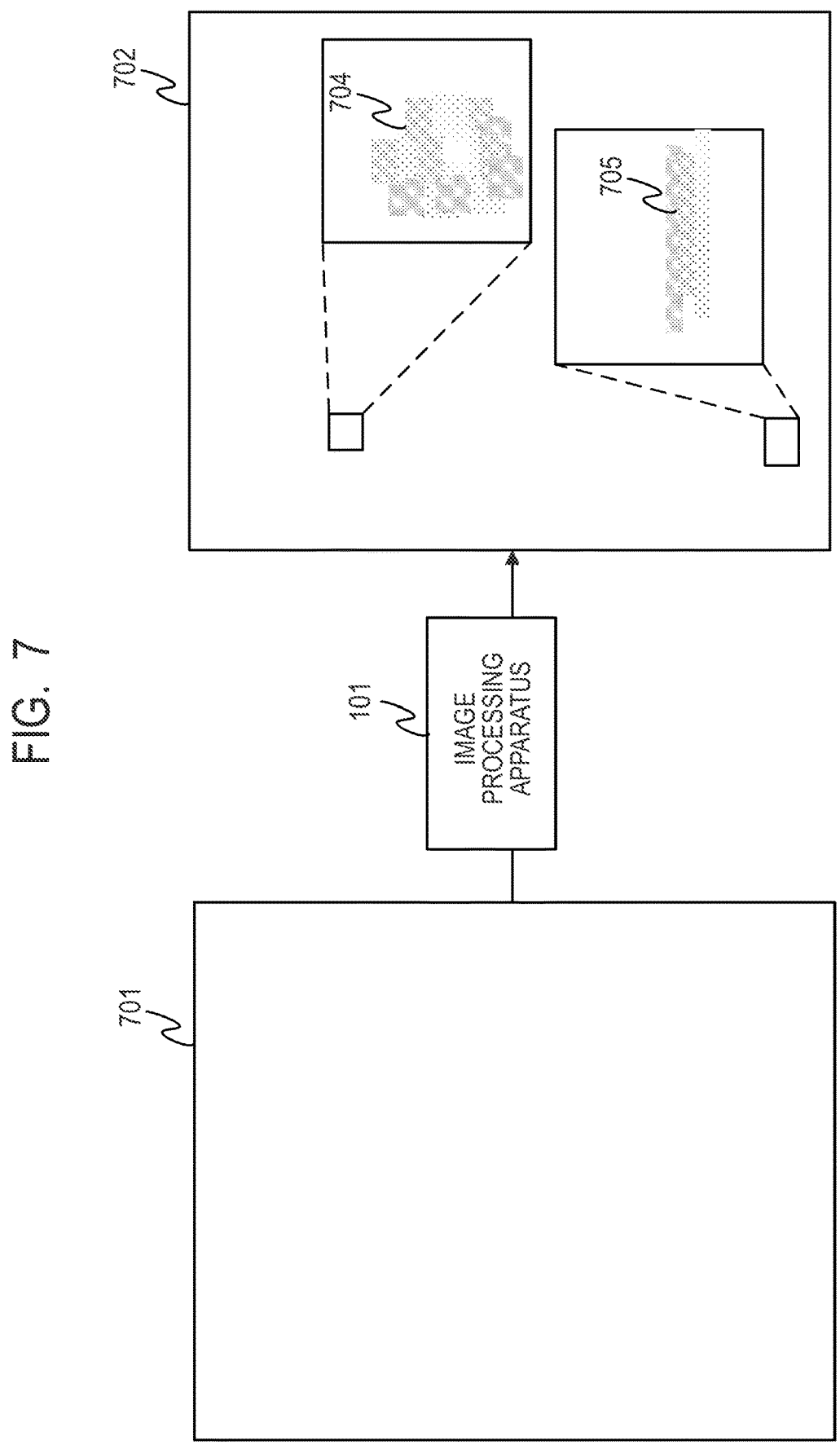

| | |
|---|---|
| \multicolumn{2}{c}{ORDER FORM} | |
| | ORDER DATE 3/4 |
| MEMBERSHIP NUMBER | 862 |
| KANA | タナカタロウ |
| NAME | 田中太郎 |
| PHONE NUMBER | D0-111-2222 |
| MODEL NUMBER | FJT98 |
| QUANTITY | 30 |
| SHIPPING ADDRESS | 北山町4丁目 |

FJT98

| ORDER FORM | |
|---|---|
| ORDER DATE | |
| MEMBERSHIP NUMBER | |
| KANA | |
| NAME | |
| PHONE NUMBER | |
| MODEL NUMBER | |
| QUANTITY | |
| SHIPPING ADDRESS | |

INFORMATION PROCESSING APPARATUS, INFORMATION PROCESSING METHOD AND NON-TRANSITORY STORAGE MEDIUM

BACKGROUND

Field

The present invention relates to an information processing apparatus, an information processing method, and a non-transitory storage medium.

Description of the Related Art

In recent years, due to changes in the working environment caused by the spread of computers, the digitization of work materials has been progressing. The target of such digitization extends to documents including handwritten letters, and techniques to extract and digitize handwritten characters have been studied.

Japanese Patent Application Laid-Open No. 2010-122791 discloses a technique for checking an insurance document, the technique including extracting a handwritten area in the insurance document and changing the number of checks by a hand depending on whether the characters can be recognized from the handwritten area. According to this technique, it is possible to extract informative handwritten characters written in the handwritten area of a printed document. In such a task of extracting a specific object (for example, handwritten characters) from an image, there has been proposed a technique of processing the image so that a shape of the object to be extracted and a type of the background can be learned under various conditions to enhance the learning data.

For achieving efficient learning, U.S. Pat. No. 10,546,217 proposes extracting an object to be recognized from an image, converting the image such as rotation, reduction, or magnification, and applying the converted image to another image as a background to create learning data.

If documents are digitized by an image processing apparatus such as an MFP (Multifunction Peripheral), noises may be generated in an image for each scan due to dirt on a sheet holder, streaks, stains, spots, etc. Such noises are specific to a device having a scanning function, and are hereinafter referred to as a "scanning noise". Since such a scanning noise is generated at random positions for each scan, it is preferable to generate an image such that the scan noises are generated at various positions as much as possible when generating learning data.

However, if learning data is created by a method for processing an image using scan images as disclosed in U.S. Pat. No. 10,546,217, the scanning noises are fixed and they appear at the same positions. Thus, performing robust learning against the influence of the noises may be difficult if using the above method. Therefore, if the learning is performed using learning data generated according to U.S. Pat. No. 10,546,217, it is not possible to sufficiently learn the influence of noises caused by scanning, and there is a possibility that the extraction accuracy of handwritten characters deteriorates due to the influence of noises.

SUMMARY

According to an aspect of the present disclosure, the information processing apparatus comprises: at least one memory that stores a program; and at least one processor that execute the program to perform: acquiring a handwriting image; acquiring a noise image; synthesizing the handwriting image and the noise image to generate a synthesized image; generating a correct label indicative of handwriting pixels in the handwriting image; and using the synthesized image and the correct label as learning data to generate a learning model for estimating handwriting pixels from an image.

Further features of the present invention will become apparent from the following description of exemplary embodiments with reference to the attached drawings.

BRIEF DESCRIPTION OF THE DRAWINGS

FIG. 7 is a diagram showing an example of a noise source image according to the first embodiment.

FIG. 11A shows an extracted handwriting image according to the first embodiment.

FIG. 11B shows an extracted background image according to the first embodiment.

DESCRIPTION OF THE EMBODIMENTS

Hereinafter, a method of creating a neural network for performing handwriting extraction using learning data generated with noises will be described. Further, a method of extracting handwritten characters from a handwritten form by using the prepared neural network, performing the character recognition of contents of the handwritten form, and storing the contents in database, etc. will be described.

First Embodiment

Figure 1:
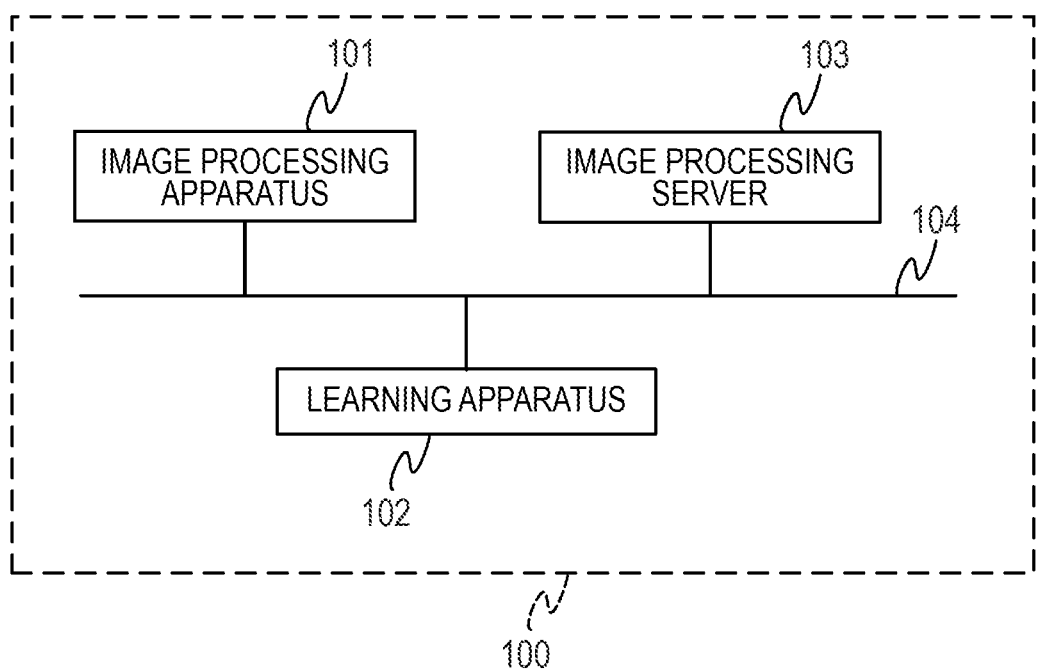
FIG. 1 is a diagram showing an example of the configuration of the image processing system according to the first embodiment.

FIG. 1 is a diagram showing an example of the configuration of the image processing system according to the first embodiment of the present invention. An image processing system 100 includes an image processing apparatus 101, a learning apparatus 102, and an image processing server 103. The image processing apparatus 101, the learning apparatus 102, and the image processing server 103 are connected through a network 104.

The image processing apparatus 101 is a digital multifunction device or the like and has a scanning function and a printing function. The image processing apparatus 101 generates image data by scanning, through the scanning function, an original on which only handwriting is written on a blank sheet (hereinafter, this image will be referred to as the "foreground source image"). The image processing apparatus 101 thus scans multiple originals to generate multiple foreground original images. The image processing apparatus 101 scans a blank sheet (a sheet not printed or not filled in by a user) to generate image data including noises generated by scanning (hereinafter, this image will be referred to as the "noise source image"). Then, the image processing apparatus 101 transmits the foreground source image and the noise source image generated as described above to the learning apparatus 102 via the network 104.

The learning apparatus 102 generates, based on the foreground source image and the noise source image generated by an image processing apparatus 101, learning data for learning a neural network that performs handwriting extraction. The learning apparatus 102 performs learning of the neural network using the generated learning data, and generates a learning result (such as parameters of the neural network). The learning apparatus 102 transmits the learning result to the image processing server 103 through the network 104.

When performing the handwriting extraction, the image processing apparatus 101 scans an original including handwriting to obtain scanned image data to be processed (hereinafter, the scanned image data is referred to as the "process target image"). Then, the image processing apparatus 101 transmits the process target image acquired as described above to the image processing server 103 via the network 104.

The image processing server 103 performs the handwriting extraction on the process target image generated by the image processing apparatus 101. Using the learning result generated by the learning apparatus 102 allows the image processing apparatus 101 to infer and extract handwriting pixels in the process target image through the neural network, and generates images (a part of image including handwriting and a part of an image including types) in which the handwriting part and the type part (background part) are separated. The image processing server 103 may transmit the images (the images including the handwriting and the types) generated as described above to a handwriting OCR server (not shown) and a typing OCR server (not shown), respectively, and receive OCR processing results. OCR stands for Optical Character Recognition.

Figure 2A:
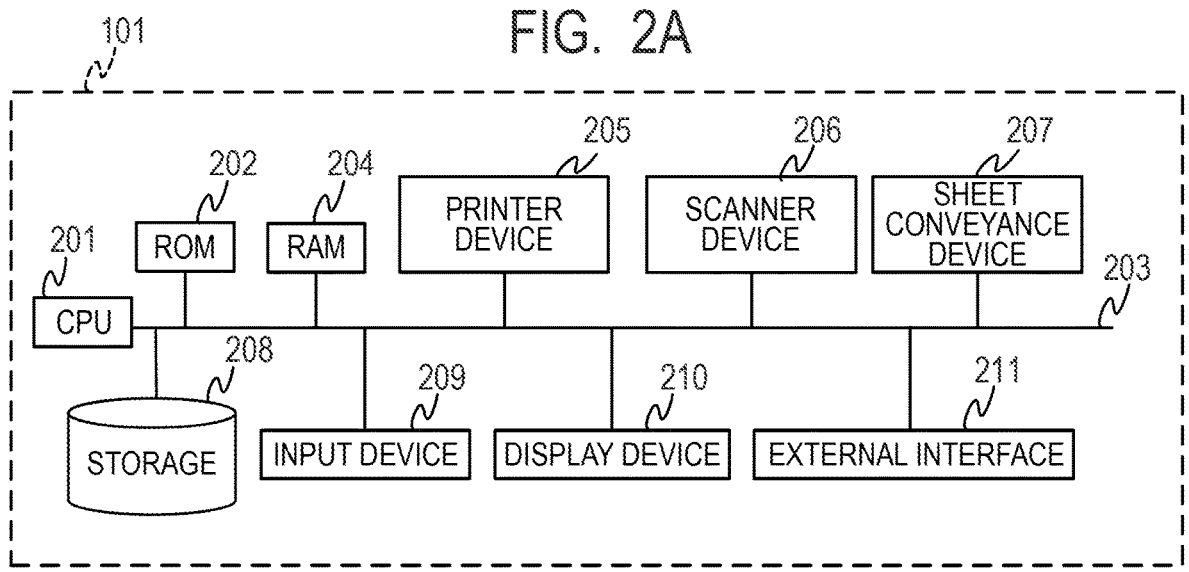
FIG. 2A is the hardware configuration diagram of the image processing apparatus.

FIG. 2A is a block diagram showing an example of hardware configuration of the image processing apparatus 101. The image processing apparatus 101 includes a CPU 201, a ROM 202, a RAM 204, a printer device 205, a scanner device 206, a sheet conveyance device 207, a storage 208, an input device 209, a display device 210, and an external interface 211. These devices are connected to each other in a communicable manner through a data bus 203.

The CPU 201 is a controller for comprehensively controlling the image processing apparatus 101. The CPU 201 boots an OS (operating system) stored in the storage 208 by a boot program stored in the ROM 202. The controller program stored in the storage 208 is executed on this OS. The controller program works for controlling the image processing apparatus 101. The CPU 201 integrally controls each device connected through the data bus 203. The RAM 204 operates as a temporary storage area such as a main memory or a work area of the CPU 201.

The printer device 205 prints image data on a sheet (recording material). The printing method could be an electrophotographic printing method using a photoreceptor drum or a photoreceptor belt, or an inkjet method in which an image is directly printed on a paper by ejecting ink from a micro nozzle array, and any method can be used.

The scanner device 206 scans an original such as a sheet using an optical reader such as a CCD (Charge Coupled Device), obtains and converts electrical signal data, and generates scanned image data. The sheet conveyance device 207, such as an ADF (Auto Document Feeder), conveys the sheet placed on the sheet holder of the sheet conveyance device 207 to the scanner device 206 one by one.

The storage 208 is a readable and rewritable non-volatile memory such as an HDD (Hard Disk Drive) or SSD (Solid State Drive), and various data such as the above-mentioned controller program are recorded therein. The input device 209 is a device composed of a touch panel, a hard key, or the like. The input device 209 receives operation instructions of a user and transmits instruction information including the instruction position to the CPU 201.

The display device 210 is a device such as an LCD or CRT. The display device 210 exhibits display data generated by the CPU 201. The CPU 201 determines which operation has been performed based on the instruction information received from the input device 209 and the display data exhibited on the display device 210. In response to the determination result, the CPU 201 controls the image processing apparatus 101, generates new display data, and causes the display device 210 to exhibit the new display data.

The external interface 211 transmits and receives various data, including image data, to and from external devices via a network such as a LAN, a telephone line, or a proximity radio such as infrared ray. The external interface 211 receives PDL data from an external device such as the learning apparatus 102 or a PC (not shown). The CPU 201 interprets the PDL data received at the external interface 211 and generates an image. The generated image is printed through the printer device 205 or stored in the storage 208. The external interface 211 receives image data from an external device such as the image processing server 103. The CPU 201 prints the received image data through the printer device 205, stores the image data in the storage 208, and transmits the image data to other external devices through the external interface 211. The external interface 211 transmits the image data generated by the scanner device 206 and the image data stored in the storage 208 to an external device such as the learning apparatus 102 and the image processing server 103.

Figure 2B:
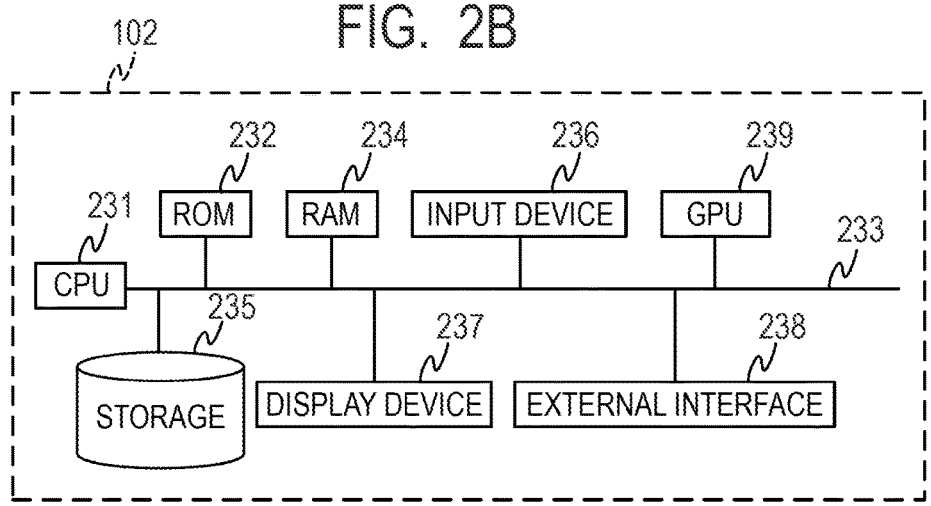
FIG. 2B is the hardware configuration diagram of the learning apparatus.

FIG. 2B is a block diagram showing an example of hardware configuration of the learning apparatus 102. The learning apparatus 102 includes a CPU 231, a ROM 232, a RAM 234, a storage 235, an input device 236, a display device 237, an external interface 238, and a GPU 239. These devices can transmit and receive data to and from each other via a data bus 233.

The CPU 231 is a controller for comprehensively controlling the learning apparatus 102. The CPU 231 starts an OS stored in the storage 235 by a boot program stored in the ROM 232 that is a nonvolatile memory. A learning data generation program and a learning program stored in the storage 235 are executed on this OS. The CPU 231 generates learning data by executing the learning data generation program. The CPU 231 executes the learning program to learn the neural network for performing handwriting extraction. The CPU 231 controls each unit via a bus such as the data bus 233.

The RAM 234 operates as a temporary storage area such as a main memory or a work area of the CPU 231. The storage 235 is a readable and rewritable non-volatile memory such as an HDD, an SSD or the like, and records various data such as the learning data generation program and the learning program.

The input device 236 is a device composed of a mouse, a keyboard, or the like. The display device 237 is a device similar to the display device 210 described in FIG. 2A. The external interface 238 is an interface similar to the external interface 211 described in FIG. 2A. The GPU 239 is an image processing processor that cooperates with the CPU 231 to generate image data and learn the neural network.

Figure 2C:
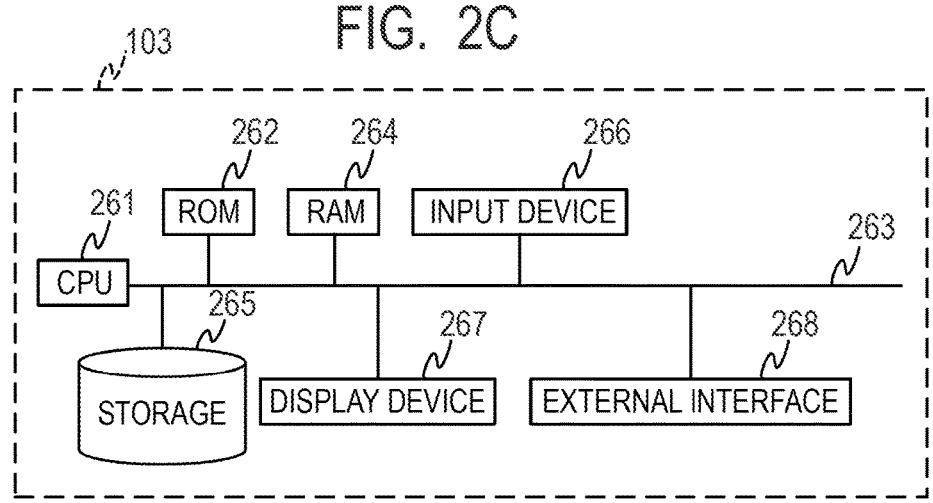
FIG. 2C is the hardware configuration diagram of the image processing server.

FIG. 2C is a block diagram showing an example of hardware configuration of the image processing server 103. The image processing server 103 includes a CPU 261, a ROM 262, a RAM 264, a storage 265, an input device 266, a display device 267, and an external interface 268. These devices can transmit and receive data to and from each other via a data bus 263.

The CPU 261 is a controller for comprehensively controlling the image processing server 103. The CPU 261 starts an OS stored in the storage 265 by a boot program stored in the ROM 262 which is a nonvolatile memory. An image processing server program stored in the storage 265 is executed on the OS. The CPU 261 executes the image processing server program to extract and erase handwriting pixels from the process target image. The CPU 261 controls each device via a bus such as the data bus 263.

The RAM 264 operates as a temporary storage area such as a main memory or a work area of the CPU 261. The storage 265 is a readable and rewritable non-volatile memory such as an HDD, an SSD or the like, and records various data such as the above-described image processing program.

The input device 266 is a device similar to the input device 236 described in FIG. 2B. The display device 267 is a device similar to the display device 210 described in FIG. 2A. The external interface 268 is an interface similar to the external interface 211 described in FIG. 2A.

The learning apparatus 102 and the image processing server 103 are information processing apparatuses, and may be implemented by a single computer or multiple computers. For example, the learning apparatus 102 and the image processing server 103 may be implemented using the cloud computing technology. The learning apparatus 102 and the image processing server 103 may be implemented by a cloud service or the like.

Figure 3:
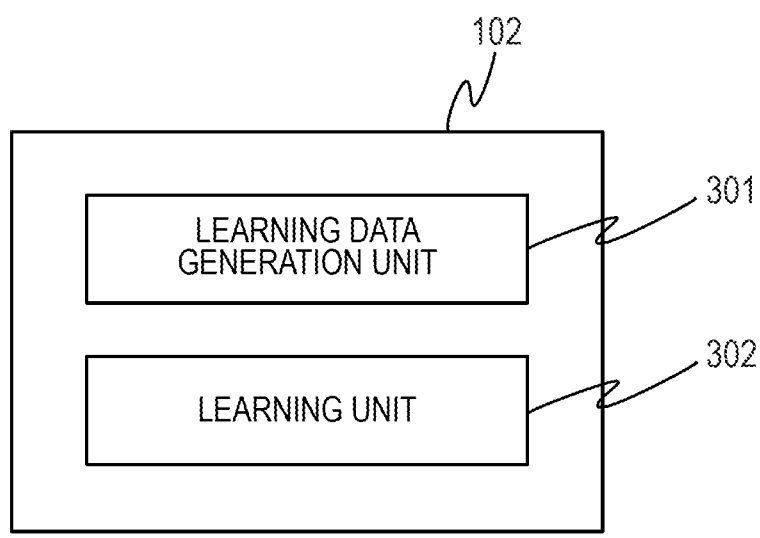
FIG. 3 is a block diagram schematically showing the logical configuration of the learning apparatus.

FIG. 3 is a block diagram schematically showing the logical configuration of the learning apparatus 102. A learning data generation unit 301 generates learning data for learning a neural network. The CPU 231 deploys and executes a learning data generation program in the RAM 234 to realize the learning data generation unit 301.

A learning unit 302 learns the neural network by using learning data generated by the learning data generation unit 301. The CPU 231 deploys and executes the learning program in the RAM 234 to realize the learning unit 302. Note that the CPU 231 may be configured to execute part of the calculation processing executed by the learning data generation unit 301 and the learning unit 302 in cooperation with the GPU 239.

Figure 4:
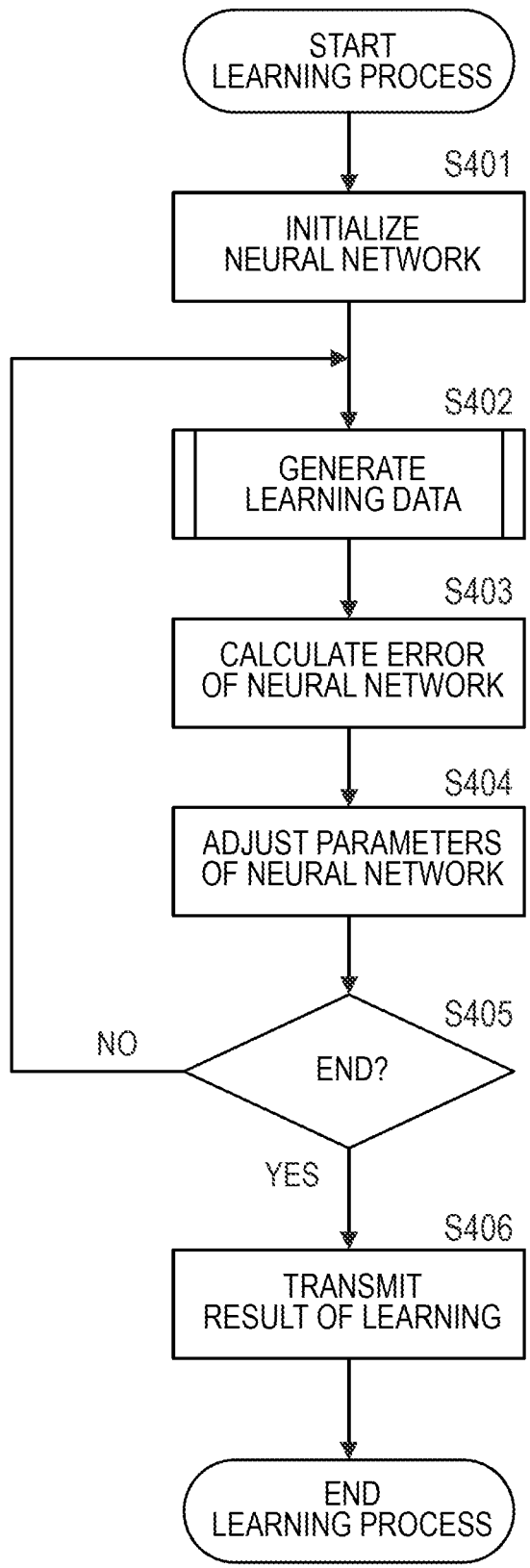
FIG. 4 is a flowchart describing the learning process according to the first embodiment.

Next, the learning process performed by the learning apparatus 102 will be described. FIG. 4 is a flowchart describing the learning process according to the first embodiment. This processing may be realized by the learning unit 302 of the learning apparatus 102. That is, the CPU 231 deploys and executes a learning program in the RAM 234. The learning process is started when the user performs a predetermined operation via the input device 209 of the image processing apparatus 101. In the present embodiment, although the mini-batch method is used for learning the neural network, it is not limited thereto. The learning process may be started not only by the means described above, but also by an input received from a PC (not shown) via the network 104 as a trigger.

First, in step S401, the CPU 231 initializes the neural network. That is, the CPU 231 constructs the neural network and randomly determines and initializes the values of each parameter included in the neural network. A variety of neural network structures can be used to construct the neural network, for example, in the form of FCN (Fully Convolutional Networks) as shown in Long, et al. "Fully Convolutional Networks for Semantic Segmentation", The IEEE Conference on Computer Vision and Pattern Recognition (CVPR), 2015, pp. 3431-3440.

Next, in step S402, the CPU 231 acquires the learning data. The CPU 231 executes the learning data generation process described later to acquire a predetermined number (mini-batch size, e.g., "10") of learning data. Here, the learning data previously generated by the learning data generation unit 301 and stored in the storage 235 may be acquired.

Next, in steps S403 to S404, the CPU 231 performs learning of the neural network. In step S403, the CPU 231 calculates an error of the neural network. First, the CPU 231 inputs an input image included in each learning data to the neural network to obtain an output. The output is an image having the same image size as the input image, and the pixel determined to correspond to handwriting as a prediction result is an image whose pixel values indicate handwriting, and the pixel determined not to correspond to handwriting is an image whose pixel values indicate not handwriting. The CPU 231 evaluates the error between the output and a correct label image to obtain an error. The cross entropy can be used as an indicator for the evaluation.

Next, in step S404, the CPU 231 adjusts the parameters of the neural network. That is, the CPU 231 changes the parameter values of the neural network by the back-propagation method based on the error calculated in step S403.

Next, in step S405, the CPU 231 determines whether or not to end the learning. More specifically, the CPU 231 determines whether or not the processes of steps S402 to S404 have been performed a predetermined number of times (for example, "60,000 times"). The predetermined number of times can be set by an operation input by the user at the start of the main learning process. If the operation has not been performed the predetermined number of times, the CPU 231 determines that the operation is not terminated (NO is determined in step S405), and the process proceeds to step S402 to continue learning the neural network.

If the processes of steps S402 to S404 have already been performed a predetermined number of times, the CPU 231 determines that the processing is terminated (YES in step S405), and the CPU 231 advances the processing to step S406.

In step S406, the CPU 231 transmits, as a learning result, the parameters of the neural network adjusted in step S404 to the image processing server 103, and ends the processing of this flowchart.

Figure 5:
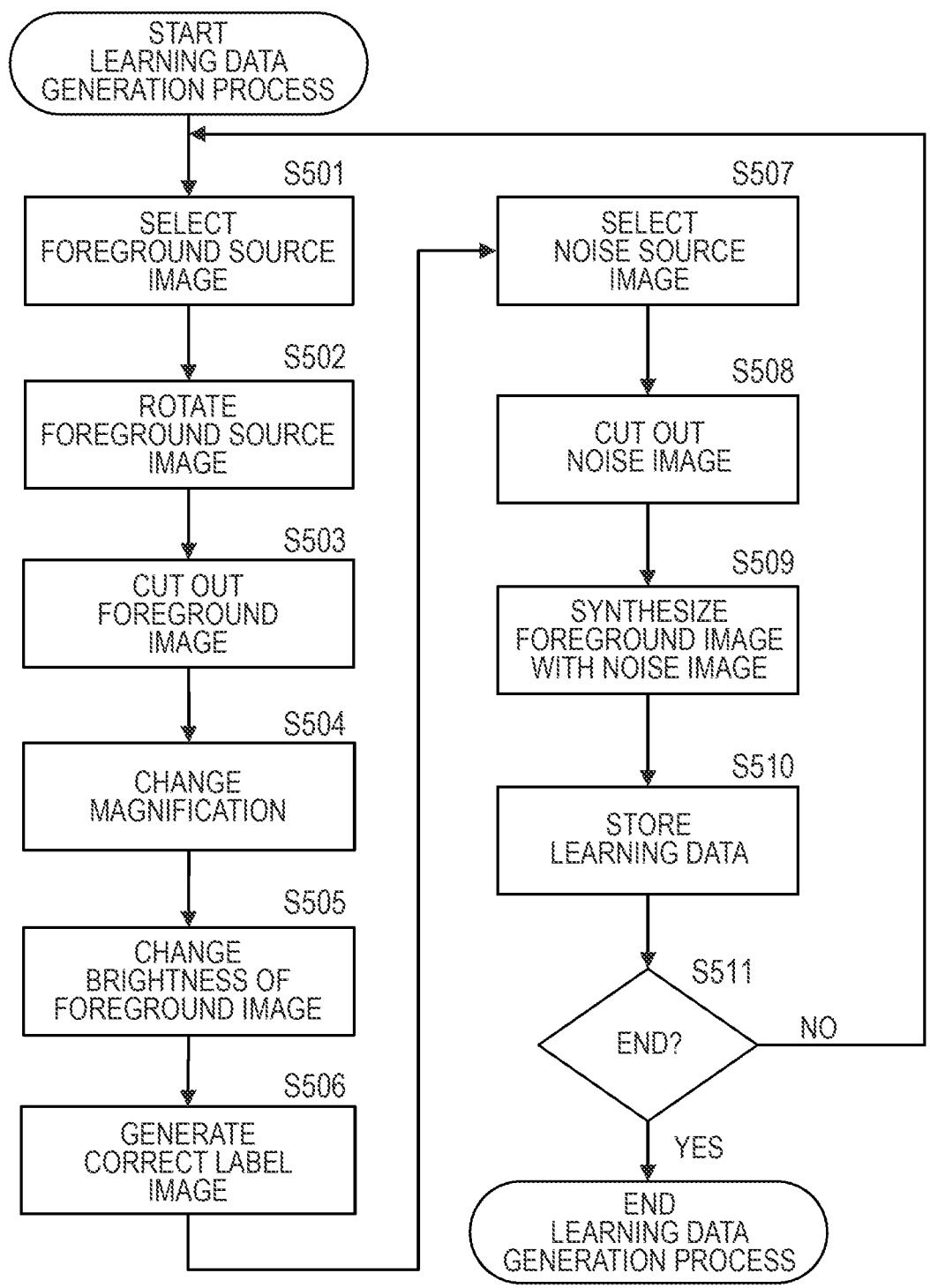
FIG. 5 is a flowchart describing the learning data generation process according to the first embodiment.

Next, the learning data generation process by the learning apparatus 102 will be described. FIG. 5 is a flowchart describing the learning data generation process according to the first embodiment. This processing is realized by the learning data generation unit 301 of the learning apparatus 102. That is, the CPU 231 deploys and executes the learning data generation in the RAM 234.

First, in step S501, the CPU 231 selects and reads a foreground source image stored in the storage 235. This foreground source image will be described with reference to FIG. 6.

Figure 6:
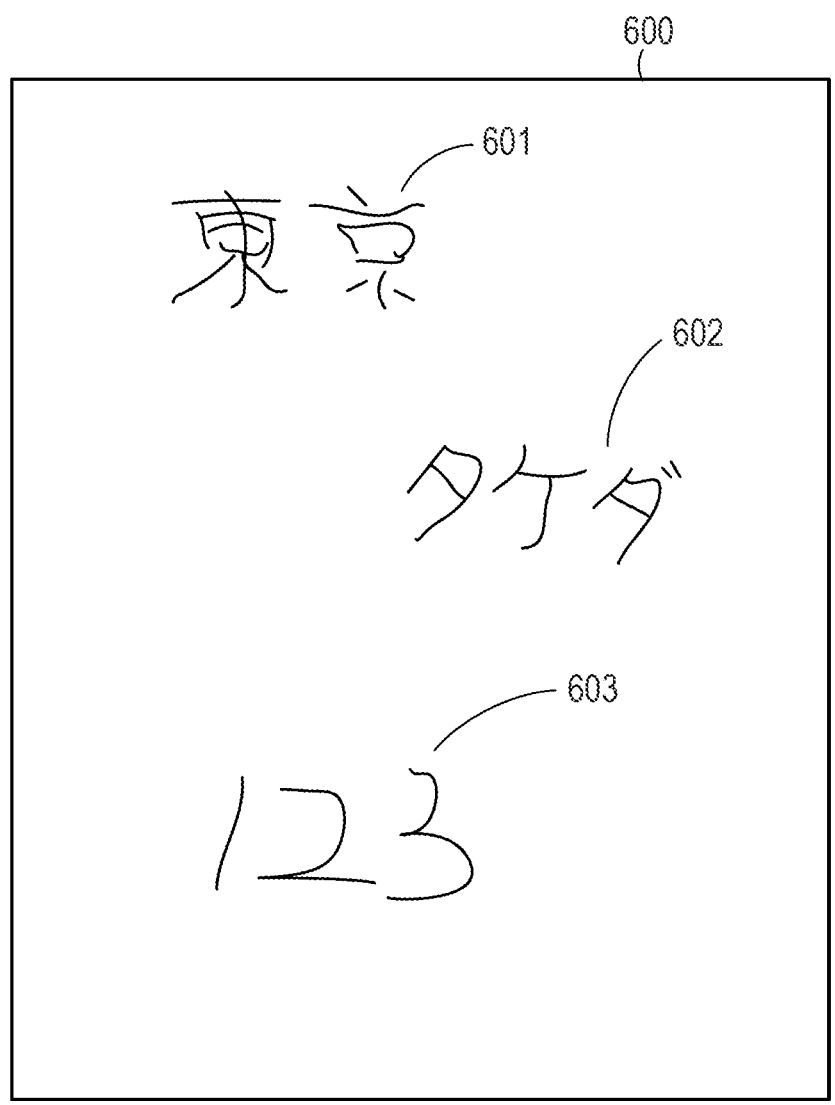
FIG. 6 is a diagram showing an example of a foreground source image according to the first embodiment.

FIG. 6 shows an example of the foreground source image. As shown in FIG. 6, the foreground source image is an image in which characters are written only by handwriting. The foreground source image is generated, for example, by the image processing apparatus 101 scanning an original on which characters 601 to 603 are handwritten on white paper 600. In the example of FIG. 6, the Japanese characters 601 to 602 and the numbers 603 are handwritten, but this is not limited to the Japanese characters. That is, the processing described later can be similarly applied to the foreground source image obtained by scanning an original written in English or the like. The learning apparatus 102 may receive a plurality of foreground source images generated as described above from the image processing apparatus 101 in advance and stores the received foreground source images in the storage 235. In step S501, one of the stored images is selected at random.

Next, in step S502, the CPU 231 rotates and processes the foreground source image read in step S501. The rotation angle is randomly selected and determined within a predetermined range (e.g., "between −10 degrees and +10 degrees").

Next, in step S503, the CPU 231 generates image data obtained by cutting out a part of the foreground original image rotated in step S502 (for example, a size of "height×width=512×512 pixels") (hereinafter, this image data will be referred to as a "foreground image"). The position to be cut out is determined at random.

Next, in step S504, the CPU 231 processes the foreground image generated in step S503 by varying the magnification. The magnification is selected and determined at random within a predetermined range (e.g., "between 50% and 150%"). Further, a part of the magnified foreground image (for example, a size of "height×width=256×256 pixels") is extracted from the center or the like to update the foreground image.

Next, in step S505, the CPU 231 changes the brightness of each pixel of the foreground image and performs processing. Specifically, the CPU 231 converts the foreground image into a grayscale image and uses gamma correction to change the brightness of the foreground image. The gamma value is selected and determined at random within a predetermined range (for example, between "0.1 and 10.0").

Next, in step S506, the CPU 231 generates a correct label image for the foreground image (correct label generation processing). First, the CPU 231 performs binarization processing on the foreground image. The CPU 231 generates image data, as a correct label image for the foreground image, in which pixel values lower than a predetermined threshold are set to a value indicating handwriting (for example, "255") and other pixel values are set to a value indicating not handwriting (for example, "0"). The binarization method is not limited to a method using a threshold, and a known binarization method can be applied.

Next, in step S507, the CPU 231 selects and reads the noise source image stored in the storage 235. This noise source image will be described with reference to FIG. 7. FIG. 7 shows an example of the noise source image. The noise source image is an image containing noise that appears in an image when books or accounts are scanned, and is generated, for example, by the image processing apparatus 101 scanning a blank sheet (that is, a sheet on which nothing is written or printed). It is considered here that the learning apparatus 102 receives the noise source image generated as described above from the image processing apparatus 101 and stores the noise source image in the storage 235 in advance.

FIG. 7 shows an example in which a noise 704 and a noise 705 are generated in a scan image 702 of a white sheet 701 obtained through the scanning function of the image processing apparatus 101. The noise 704 represents, for example, a scanning noise appearing randomly by scanning. The noise 705 represents a streaky noise caused by, for example, stain stuck on the image processing apparatus 101. In addition to these noises, a noise through reading devices (CCD, line sensor), a compression noise due to image compression performed in the image processing process, and the like are also included.

Next, in step S508, the CPU 231 generates image data obtained by cutting out a part of the noise source image acquired in step S507 (for example, a size of "height×width=512×512 pixels") (hereinafter, this image data is referred to as a "noise image"). The position to be cut out is determined at random. Note that the pixel values of the noise image cut out at this time may be evaluated not to adopt noise images that do not contain certain amount of noises, and to cut out the noise image at another position. For example, if the brightness value of the pixel value is lower than a threshold value (for example, "200"), it is determined that noise is generated in the pixel, and the determination is performed for each pixel in the cut image. If a ratio of noises in the cutout noise image is lower than a predetermined ratio (for example, "10%" of the number of pixels), the cutout noise image may not be adopted, and another noise image may be cut out again. Note that the noise determination processing is not limited to this configuration, and another configuration for evaluating the presence or absence of noises may be used.

Next, in step S509, the CPU 231 synthesizes the foreground image acquired in steps S501 to S505 and the noise image acquired in steps S507 to 508 to generate an image (hereinafter, this image will be referred to as a "synthesized image"). For example, for synthesizing the images, the CPU 231 compares pixel values on the same coordinates of the foreground image and the noise image, and adopts pixel values having lower brightness to generate a new image. The synthesizing means is not limited to the above, and for example, pixel values may be determined by blending pixels on the same coordinates of each image with a certain ratio.

Next, in step S510, the CPU 231 associates the synthesized image generated in step S509 with the correct label image generated in step S506, and stores the association as learning data in a given area of the storage 235.

Next, in step S511, the CPU 231 determines whether or not to terminate the learning data generation process. If the CPU 231 has not yet generated the predetermined number of pieces of learning data, the CPU 231 determines that the process has not been finished yet (NO is determined in step S511), and the process proceeds to step S501.

On the other hand, if the CPU 231 has generated the predetermined number of pieces of learning data, the CPU 231 determines to end the process (YES in step S511), and the process of this flowchart ends.

FIGS. 8A to 8D show examples of synthesized images obtained by combining the foreground image and the noise image according to the first embodiment.

Figure 8A:
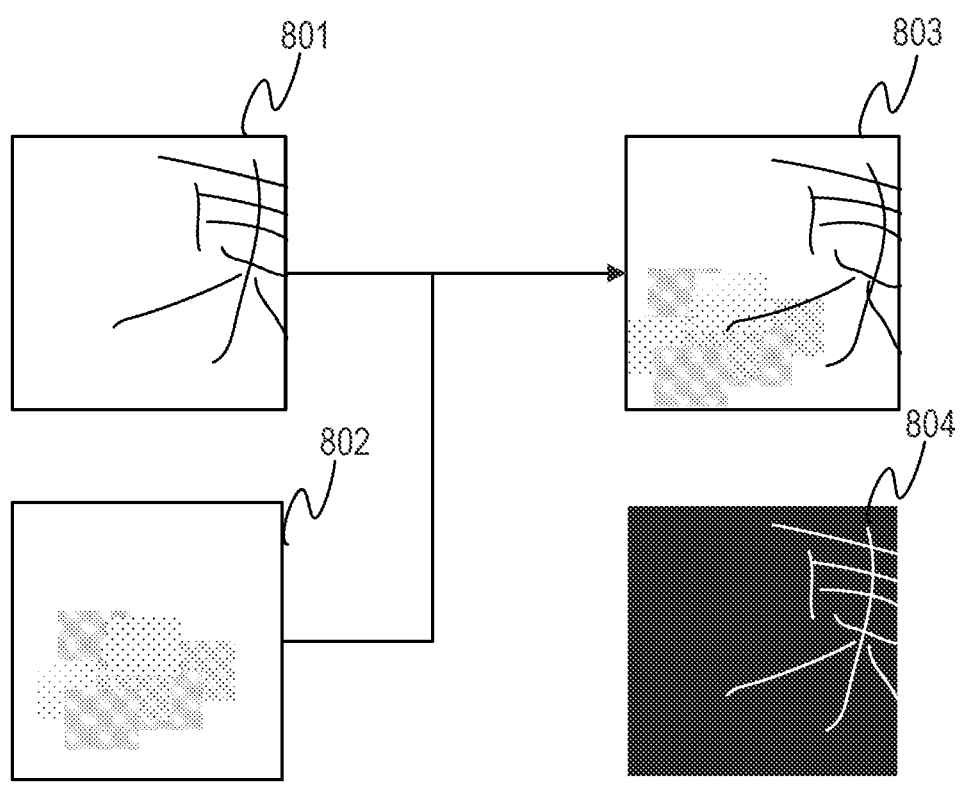
FIG. 8A is a diagram describing the composition of a foreground image and a noise image according to the first embodiment.

FIG. 8A is a conceptual diagram of processing at the time of synthesizing the learning image according to the first embodiment. A foreground image 801 is an example of the foreground image generated by the processing in steps S501 to S505 of FIG. 5. That is, the foreground image 801 is an image in which the handwritten characters 601 in the foreground original image 600 illustrated in FIG. 6 are partially cut out and subjected to processing such as rotation. A noise image 802 is an example of a noise image generated by steps S507 to S508 of FIG. 5. That is, the noise image 802 is an image generated by partially cutting out the noise 704 in the noise source image 702 illustrated in FIG. 7.

A synthesized image 803 is an example of the synthesized image generated by step S508 in FIG. 5. The image is generated by comparing pixel values of the foreground image 801 and the noise image 802 on the same coordinates. A correct label image 804 is an example of the correct label image generated by step S506 of FIG. 5. The pixels are configured to represent a portion of the handwritten character of the image 801, and are treated as learning data so as to be paired with the synthesized image 803.

Figure 8B:
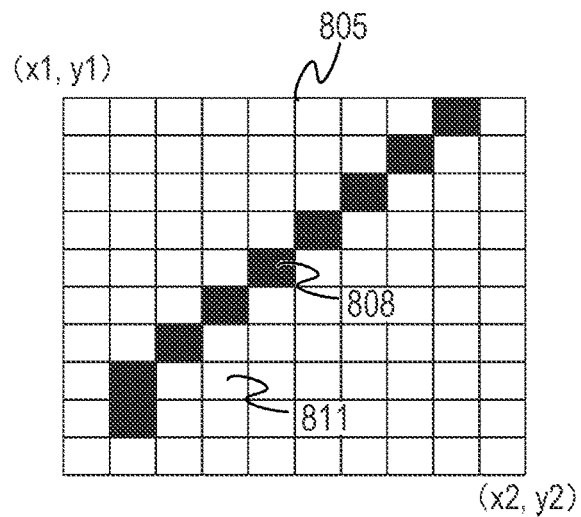
FIG. 8B is a diagram describing the composition of the foreground image and the noise image according to the first embodiment.
Figure 8C:
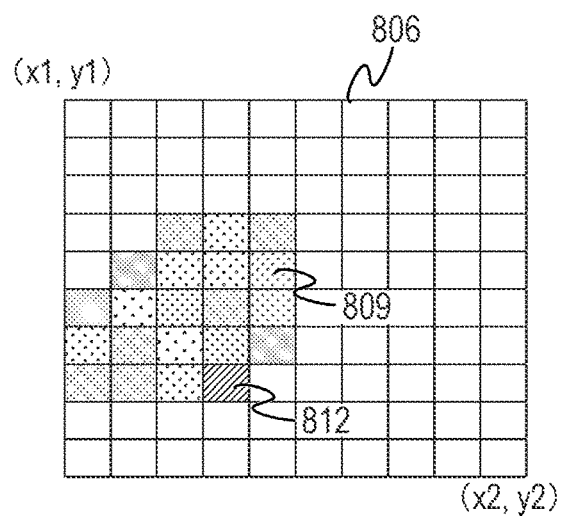
FIG. 8C is a diagram describing the composition of the foreground image and the noise image according to the first embodiment.
Figure 8D:
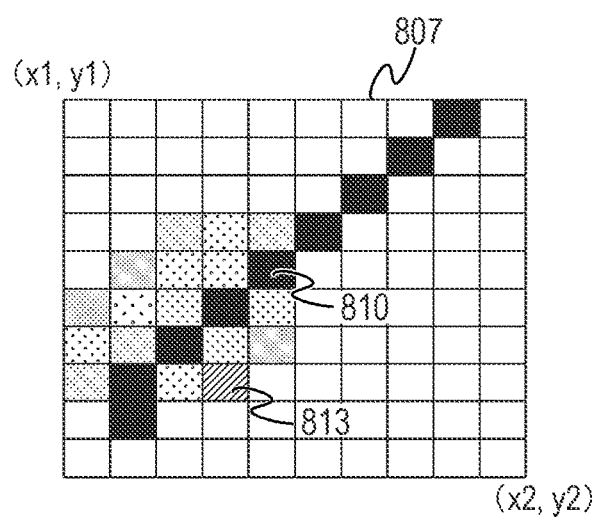
FIG. 8D is a diagram describing the composition of the foreground image and the noise image according to the first embodiment.

FIGS. 8B, 8C, and 8D are enlarged views of portions cut out on the same coordinates (width: x1 to x2, height: y1 to y2) in the foreground image 801, the noise image 802, and the synthesized image 803, respectively. Each of the squares in FIGS. 8B to 8D represents each pixel constituting the image.

Each pixel of a synthesized image 807 is determined based on the pixel values at the same coordinates of a foreground image 805 and a noise image 806 to be combined as described above. A pixel 810 in the synthesized image 807 is adopted after comparing the brightness value of a pixel 808 in the foreground image 805 with the brightness value of a pixel 809 in the noise image 806 on the same coordinates to select a pixel having a lower brightness value. For the pixel 810, it is determined that the pixel 808 in the foreground image 805 has a lower brightness value, so that the brightness value of the pixel 808 is adopted as a brightness value of the pixel 810. On the other hand, for a pixel 813, a pixel 811 in the foreground image 805 is compared with a pixel 812 in the noise image 806, and the pixel 812 of the noise image 806 is determined to have a lower brightness value so that the brightness value of the pixel 812 is adopted as a brightness value of the pixel 813 in the synthesized image 807.

As described above, according to the present embodiment, the synthesized image is generated by synthesizing a handwritten character image (foreground image) and a noise image, and learning data is generated by combining the synthesizing result and the label information (correct label image) of the handwritten character. Thus, learning data for various noises can be generated, and robust learning against noises can be performed.

Next, an example of reading image data from an original by the scanning function of the image processing apparatus 101 and performing the extraction of handwritten characters through the image processing server 103 will be described. First, the image processing apparatus 101 scans an original including typed and handwritten characters to obtain a process target image. Then, the process target image is transmitted to the image processing server 103 to request extraction of the handwritten characters.

Figure 9A:
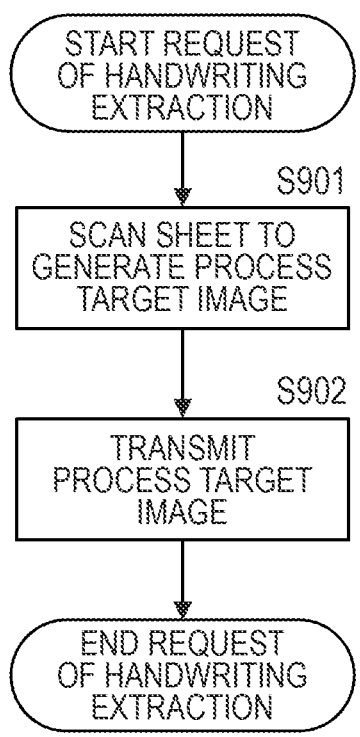
FIG. 9A is a flowchart describing the handwriting extraction request processing according to the first embodiment.

FIG. 9A is a flowchart showing an example of handwriting extraction request processing by the image processing apparatus 101. This processing is realized by the CPU 201 of the image processing apparatus 101 reading a controller program recorded in the storage 208, deploying the program into the RAM 204, and executing the program. This processing is started when the user performs a predetermined operation through the input device 209 of the image processing apparatus 101.

Figures 10A, 10B:
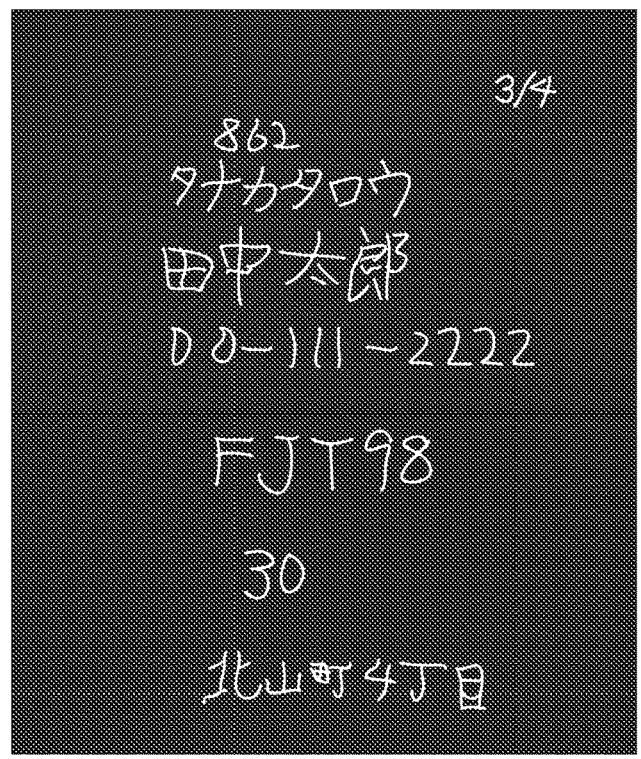
FIG. 10A is a diagram describing the process target image according to the first embodiment.
FIG. 10B is a diagram describing a result of estimating handwriting pixels from the process target image according to the first embodiment.

First, in step S901, the CPU 201 controls the scanner device 206 and the sheet conveyance device 207 to scan an original and generate the process target image. The process target image is generated as full-color (RGB 3 channels) image data. The original to be scanned is, for example, a form such as an order form as shown in FIG. 10A, and values are handwritten on the right side of each item.

Next, in step S902, the CPU 201 transmits the process target image generated in step S901 to the image processing server 103 via the external interface 211.

Next, the handwriting extraction processing by the image processing server 103 will be described. The image processing server 103 receives the process target image from the image processing apparatus 101, and obtain image data by extracting the handwritten characters included in the scanned process target image.

Figure 9B:
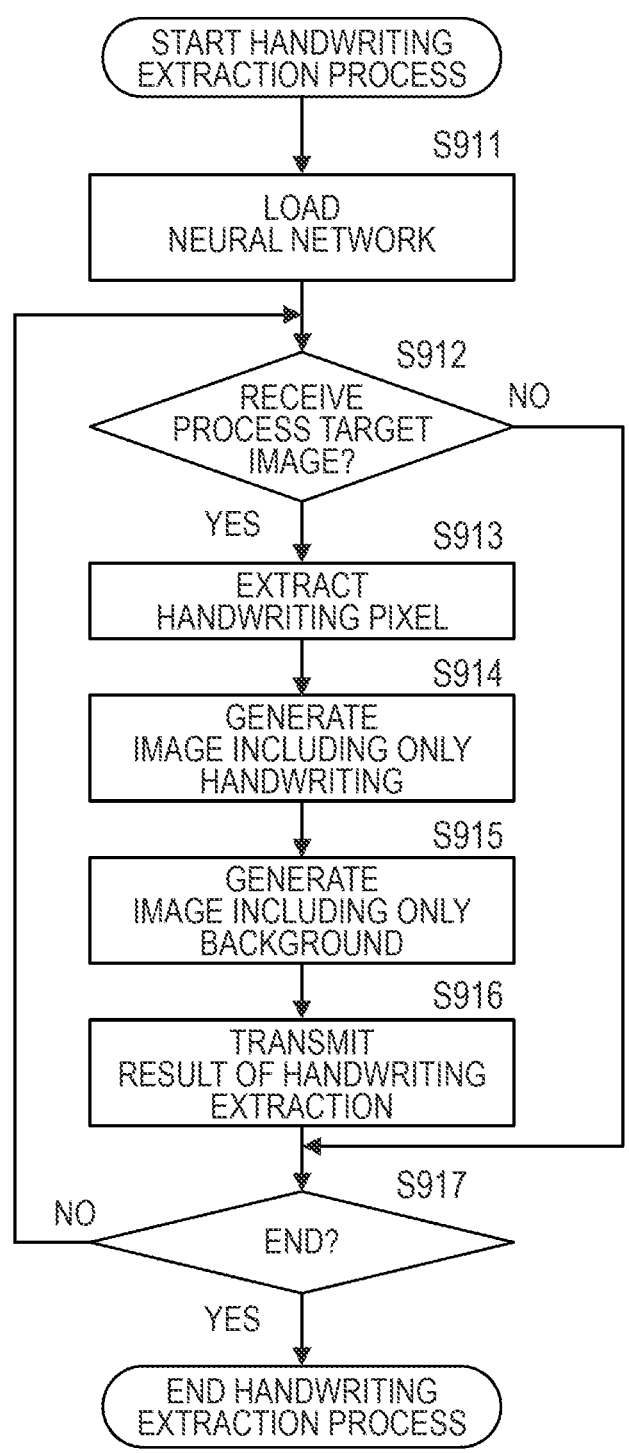
FIG. 9B is a flowchart describing the handwriting extraction processing according to the first embodiment.

FIG. 9B is a flowchart showing an example of the handwriting extraction processing by the image processing server 103. This processing is realized by the CPU 261 reading the image processing server program stored in the storage 265, deploying the program into the RAM 264, and executing the program. This processing is started, for example, when the user turns on the image processing server 103.

First, in step S911, the CPU 261 loads the neural network for performing the handwriting extraction. First, the CPU 261 constructs the same neural network shown in step S401 of FIG. 4. Then, the learning result (parameters of the neural network) transmitted from the learning apparatus 102 in step S406 of FIG. 4 is reflected on the constructed neural network. This generates a learned model for estimating the handwriting pixels from the image. It is assumed that the image processing server 103 has received the learning result transmitted from the learning apparatus 102 in step S406 of FIG. 4 and stored the result in the storage 265 in advance.

Next, in step S912, the CPU 261 determines whether the process target image has been received and acquired from the image processing apparatus 101. If the process target image has been acquired through the external interface 268 (YES in step S912), the CPU 261 advances the process to step S913. On the other hand, if the process target image has not been acquired through the external interface 268 (NO in step S912), the CPU 261 advances the process to step S917.

In step S913, the CPU 261 extracts handwriting pixels from the process target image received from the image processing apparatus 101. First, the CPU 261 converts the process target image into grayscale. The converted process target image is input to the neural network constructed in step S911 to estimate the handwriting pixels. That is, the learned model generated in step S911 is used to estimate the handwriting pixel. A value indicative of handwriting (e.g., "1") is given to pixels that are determined to have the same size as the process target image and to correspond to the handwriting. Another value indicative of non-handwriting (e.g., "0") is given to pixels that are not determined to correspond to handwriting. As a result, image data in which these values indicative of handwriting and non-handwriting are recorded can be acquired.

For example, FIG. 10B shows an image obtained by estimating handwriting pixels based on the image of FIG. 10A as a "process target image". In FIG. 10B, pixels having a value of "0" are represented by black, and pixels having a value of "1" are represented by white for making the result easier to understand. Hereinafter, this image data will be referred to as the "estimation result".

Next, in step S914, the CPU 261 extracts a portion corresponding to handwriting from the process target image, using the estimation result created in step S913 as a mask, and creates an image with only handwriting. Specifically, an image having the same size as the process target image is created, and pixel values of the process target image are put into the coordinates (pixels) if the estimation result indicates that the coordinates (pixels) correspond to handwriting, and a value "255" is put into the coordinates (pixels) if the estimation result does not indicate that the coordinates (pixels) correspond to handwriting. Hereinafter, this image is referred to as the "extracted handwriting image". The extracted handwriting image created here is illustrated in FIG. 11A.

Next, in step S915, the CPU 261 extracts a portion corresponding to the background from the process target image, using the estimation result created in step S913 as a mask, and creates an image with only the background. Specifically, an image having the same size as the process target image is created, and pixel values of the process target image are put into the coordinates (pixels) if the estimation result does not indicate that the coordinates (pixels) correspond to handwriting, and a value "255" is put into the coordinates (pixels) if the estimation result indicates that the coordinates (pixels) correspond to handwriting. Hereinafter, this image is referred to as the "background extracted image". FIG. 11B shows an example of the background extracted image created here.

Next, in step S916, the CPU 261 outputs the extracted handwriting image and the background extracted image. More specifically, the CPU 261 transmits the extracted handwriting image obtained in step S914 and the background extracted image obtained in step S915 to the image processing apparatus 101 via the external interface 268.

Next, in step S917, the CPU 261 determines whether or not to terminate the process. If the user performs a predetermined operation such as turning off the image processing server 103, the CPU 261 determines that the processing is terminated (YES in step S917), and the processing of this flowchart is terminated. If this is not the case, the CPU 261 determines that the process is not terminated (NO is determined in step S917), and the process proceeds to step S912.

Although the handwriting extraction result is transmitted to the image processing apparatus 101 in step S916, other processing may be performed. For example, the extracted handwriting image and the background extracted image may be transmitted to a handwriting OCR server (not shown) and a typing OCR server (not shown) through the external interface 268, respectively, as an input of each OCR, or may be transmitted to a database server (not shown) to store the images. Thus, the output destination of the handwriting extraction result is not limited.

As described above, learning data for learning a neural network extracting handwritten characters is generated. The handwriting extraction is performed by synthesizing handwritten characters and noises by using image data containing only handwritten characters and image data containing only noise. Then, the generated learning data is used to learn the neural network. The result of the learning the neural network allows to extract an area of handwritten characters from a scanned image. At this time, the learning process through the combination of the noise image with the learning data allows to obtain the accurate extraction result without the influence of noises generated at the time of scanning.

According to the present embodiment, the learning data generation unit 301 and the learning unit 302 are implemented in the learning apparatus 102, but these units may be implemented in separate devices. In this case, the device implementing the learning data generation unit 301 transmits the learning data generated by the learning data generation unit 301 to the device implementing the learning unit 302. The learning unit 302 learns a neural network based on the received learning data.

Further, although the image processing apparatus 101 and the image processing server 103 are described as separate apparatuses, but it is not limited to this configuration. For example, multiple functions may be integrated to be performed by the same apparatus.

According to the present embodiment, in the learning process, the learning data generation process is called to generate learning data. However, a large amount of learning data may be generated in advance by the learning data generation process, and a proper amount for the mini-batch size may be taken for sampling from the generated learning data at any time during the learning processing.

In addition, it is also possible to generate the foreground source image by scanning an original document on which only a seal is made (an original document with only a seal on a blank sheet), or to generate the foreground source image by scanning the back surface of a thin sheet on which an electronic document is printed. As a result, it is possible to synthesize and generate learning data for learning a neural network detecting pixels corresponding to stamping and back-reflection.

In addition, the foreground image obtained in steps S505 and S506 of FIG. 5 and the correct label image for the foreground image may be included in the learning data. As the noise image obtained at step S508 in FIG. 5 and the correct label image for the noise image, an image having the same image size as the noise image and a value indicating that all pixels do not correspond to handwriting may be generated and included in the learning data.

According to the present embodiment, the input image is generated as a grayscale image, but it may be generated in another format such as a full-color image.

Although the noise image is not subjected to image processing such as rotation in the present embodiment, means for generating an image including image processing (steps S502, S504, S505, etc. in FIG. 5) may be employed for the noise image as in the case of the foreground image.

Second Embodiment

In the first embodiment, a noise image is synthesized with respect to a foreground image which is an image including handwriting characters. However, the foreground image may be synthesized with an image including background information such as types or ruled lines (hereinafter referred to as the "background original image"), and the noise image may be combined with the synthesized image.

Figures 12A, 12B:
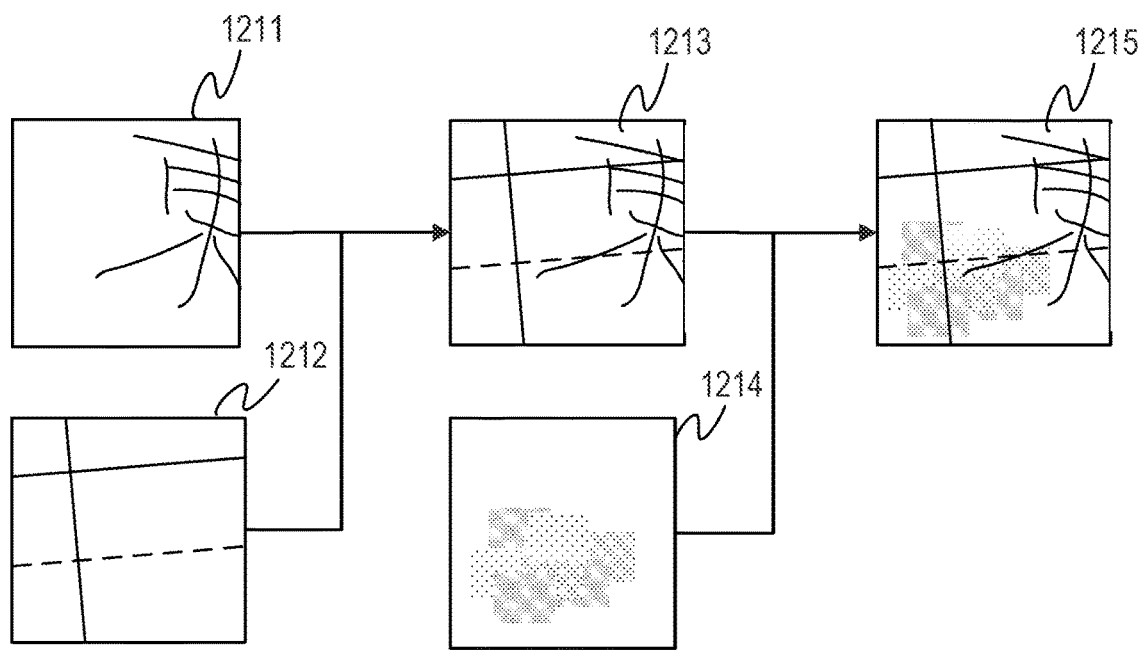
FIG. 12A is a diagram describing a composition of a background source image according to the second embodiment.
FIG. 12B is a diagram describing a learning image according to the second embodiment.

FIG. 12A is a diagram illustrating a background source image according to the second embodiment. A background original image 1201 shows a format of an account form. According to the second embodiment, as shown in FIG. 12A, the background information includes types 1202 representing input items of the form and ruled lines 1203, and is used as a material for the synthesis.

FIG. 12B shows a synthesized image of the learning image according to the second embodiment, and shows an example of the synthesis if the background image is added to an example of the first embodiment in which the foreground image and the noise image are used.

In the example of FIG. 12B, a foreground image 1211 and a background image 1212 are first synthesized to generate a synthesized image 1213. As the background image 1212, an original background original image (for example, the background original image 1201) is processed in the same manner as shown in steps S501 to S505 of FIG. 5 of the first embodiment to use a partially cutout image. Then, a noise image 1214 is further synthesized with the generated synthesized image 1213 to generate a final learning data image 1215. The method for generating the foreground image and the noise image is same as that of the first embodiment.

In the learning data generation process of the above embodiments, when the noise image is synthesized with respect to the foreground image or the synthesized image obtained by synthesizing the foreground image and the background image, some images may include no noise image synthesized with the foreground/synthesized images at a certain rate. This allows to include learning data if the influence of noise is small.

In each of the above embodiments, a model using the neural network is exemplified as a model for estimating handwriting pixels from an image, but the present invention is not limited thereto.

As described above, in each embodiment, a synthesized image is generated by using an image including handwritten characters and an image including only noises, and the learning process is performed by associating the synthesis result with the label information of handwritten characters. Thus, learning data with various noises can be generated, and the robust learning against noises can be performed. As a result, the influence of noises caused by scanning or the like can be sufficiently learned, and the deterioration of the extraction accuracy of handwritten characters caused by the influence of noises can be suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-136149, filed Aug. 24, 2021, which is hereby incorporated by reference herein in its entirety.

What is claimed is:

1. An information processing apparatus comprising:
at least one memory that stores a program; and
at least one processor that executes the program to:
acquire a handwriting image;
generate a correct label image by binarizing the acquired handwriting image, the correct label image being indicative of handwriting pixels in the acquired handwriting image;
obtain a first scan image generated by reading a blank sheet;
acquire a noise image by cutting a part of the obtained first scan image out, a position of the part being randomly determined from the obtained first scan image;
synthesize the acquired handwriting image and the acquired noise image to generate a synthesized image; and
use the synthesized image and the correct label image as learning data for generating a learning model that is usable for estimating handwriting pixels from an image.

2. The information processing apparatus according to claim 1, wherein the handwriting image is obtained by performing at least one of a rotation processing, a cutting out processing, a magnification varying processing, and a brightness changing processing for a second scan image generated by reading a sheet including handwriting.

3. The information processing apparatus according to claim 1, wherein a pixel value of the synthesized image is determined by comparing pixel values of corresponding pixels in the acquired handwriting image and the acquired noise image.

4. The information processing apparatus according to claim 1, wherein the synthesized image is generated by synthesizing the acquired handwriting image, the acquired noise image, and an image including information associated with a background.

5. The information processing apparatus according to claim 1, wherein the at least one processor executes the program to further:
generate the learning model for estimating handwriting pixels from an image by using the learning data.

6. The information processing apparatus according to claim 5, wherein the at least one processor executes the program to further:
estimate handwriting pixels from a process target image by using the generated learning model.

7. The information processing apparatus according to claim 6, wherein the at least one processor executes the program to further:
generate, based on a result of the estimating, an extracted image corresponding to handwriting and an extracted image corresponding to a background from the process target image.

8. The information processing apparatus according to claim 5, wherein the handwriting pixels are estimated from a process target image by an extraction processing apparatus that is different from the information processing apparatus and uses the generated learning model for the estimation.

9. An information processing method comprising:
acquiring a handwriting image;
generating a correct label image by binarizing the acquired handwriting image, the correct label image being indicative of handwriting pixels in the acquired handwriting image;
obtaining a first scan image generated by reading a blank sheet;
acquiring a noise image by cutting a part of the obtained first scan image out, a position of the part being randomly determined from the obtained first scan image;
synthesizing the acquired handwriting image and the acquired noise image to generate a synthesized image; and
using the synthesized image and the correct label image as learning data for generating a learning model that is usable for estimating handwriting pixels from an image.

10. A non-transitory computer readable storage medium storing instructions that causes a computer to:
acquire a handwriting image;
generate a correct label image by binarizing the acquired handwriting image, the correct label image being indicative of handwriting pixels in the acquired handwriting image;
obtain a first scan image generated by reading a blank sheet;
acquire a noise image by cutting a part of the obtained first scan image out, a position of the part being randomly determined from the obtained first scan image;
synthesize the acquired handwriting image and the acquired noise image to generate a synthesized image; and
use the synthesized image and the correct label image as learning data for generating a learning model that is usable for estimating handwriting pixels from an image.

* * * * *